(12) United States Patent
Makita et al.

(10) Patent No.: US 7,089,732 B2
(45) Date of Patent: Aug. 15, 2006

(54) TRANSMITTING SYSTEM FOR SMALL-SIZED VEHICLE

(75) Inventors: Seiji Makita, Hamamatsu (JP); Yoshihisa Yamamoto, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 316 days.

(21) Appl. No.: 10/700,052

(22) Filed: Nov. 4, 2003

(65) Prior Publication Data
US 2004/0139742 A1   Jul. 22, 2004

(30) Foreign Application Priority Data

| Nov. 5, 2002 | (JP) | ............................. 2002-321592 |
| Nov. 5, 2002 | (JP) | ............................. 2002-321593 |
| Nov. 5, 2002 | (JP) | ............................. 2002-321594 |
| Nov. 5, 2002 | (JP) | ............................. 2002-321600 |

(51) Int. Cl.
*F16H 41/24* (2006.01)
*F16H 47/06* (2006.01)

(52) U.S. Cl. .......................................... 60/345; 60/364

(58) Field of Classification Search .................. 60/330, 60/341, 345, 364
See application file for complete search history.

(56) References Cited

FOREIGN PATENT DOCUMENTS

| JP | 56167952 A | * 12/1981 |
| JP | 2000-312627 | 8/2000 |

* cited by examiner

*Primary Examiner*—Thomas E. Lazo
(74) *Attorney, Agent, or Firm*—Arent Fox PLLC

(57) ABSTRACT

In a transmitting system for a small-sized vehicle, a centrifugal clutch, and a torque converter including a pump impeller connected to an output drum of the centrifugal clutch and a turbine impeller connected to an output gear, are placed between a crankshaft of an engine and the output gear. The pump impeller and the output drum adjacent to the pump impeller are integrally coupled, with an open surface of the output drum facing to an opposite side to the pump impeller, to be constructed as a single component. Thus, occurrence of rotation vibrations and unusual noises can be prevented without requiring machining with high precision, and the numbers of components and assembling steps can be reduced while providing favorable maintainability.

6 Claims, 3 Drawing Sheets

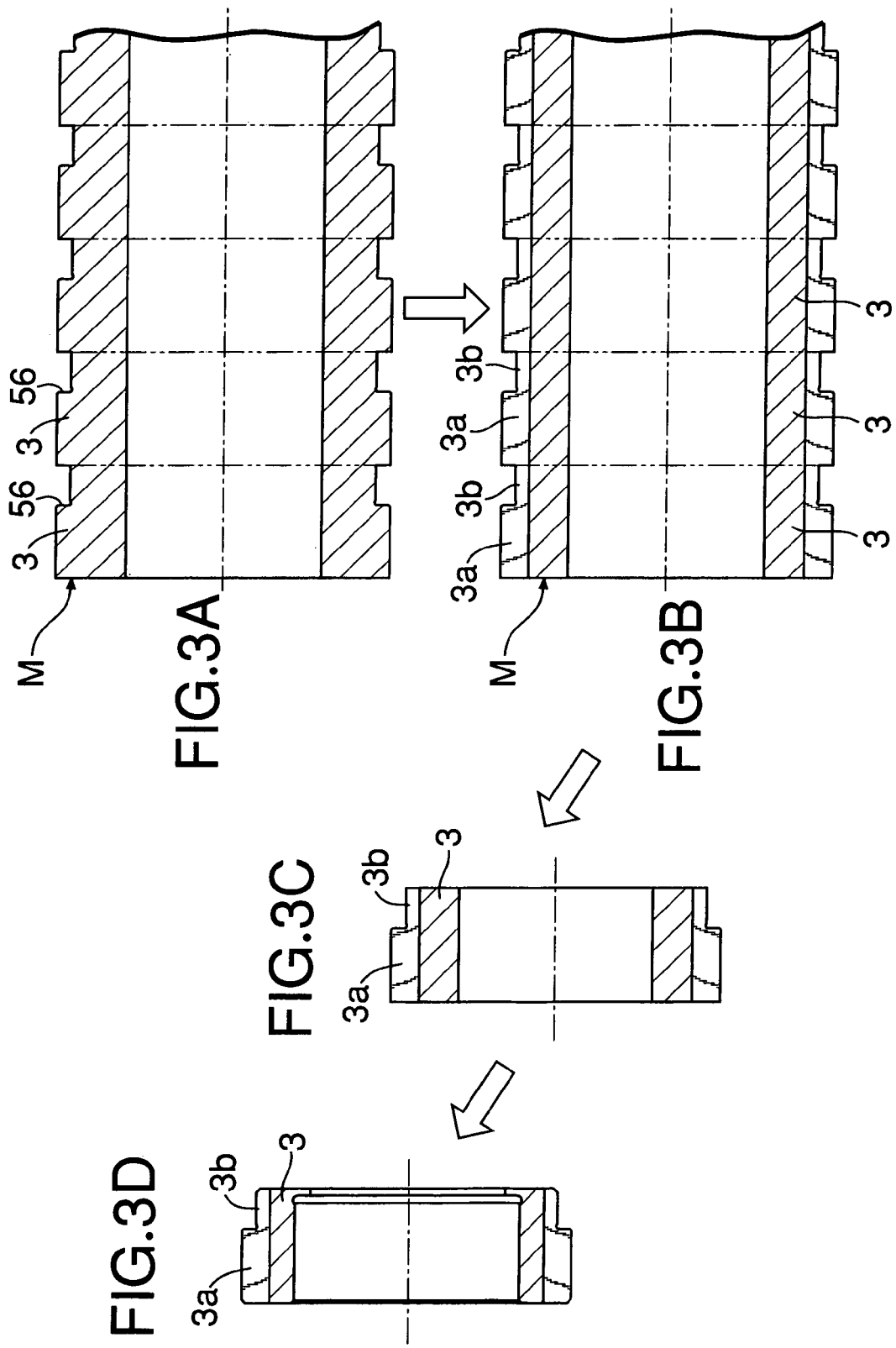

TRANSMITTING SYSTEM FOR SMALL-SIZED VEHICLE

BACKGROUND OF THE INVENTION

1. Field of the Invention

The present invention relates to a transmitting system for a small-sized vehicle such as a two-wheeled motor vehicle and a buggy, and particularly to an improvement in a transmitting system for a small-sized vehicle, in which a centrifugal clutch and a torque converter are interposed in series between a crankshaft of an engine and an output gear relatively rotatably carried on the crank shaft.

2. Description of the Related Art

Such a transmitting system for a small-sized vehicle is already known as disclosed in, for example, FIG. 17 of Japanese Patent Application Laid-open No. 2000-213627.

This transmitting system for a small-sized vehicle prevents drag of a small-sized vehicle caused by creep of a torque converter due to the disengaged state of a centrifugal clutch during idling of an engine, and at the time of start and acceleration, the transmitting system can perform smooth power transmission and torque amplification by cooperation between the centrifugal clutch and the torque converter.

In such a conventional transmitting system for a small-sized vehicle, a drum of the centrifugal clutch is spline-coupled to a diving plate connected to a crankshaft, its open surface is made adjacent to a pump impeller of the torque converter, and a clutch output member disposed inside this drum is splin-fitted to a hub of the pump impeller.

In such a conventional transmitting system, the drum at the outermost side has to be removed in the process of the maintenance of the centrifugal clutch, and therefore it cannot be said that favorable operability is provided. In addition, since the pump impeller and the clutch output member are independent components which are spline-coupled to each other, it is necessary to work the spline coupling portions of both of them with high precision to prevent rotation vibrations and unusual noises by eliminating play between them while securing concentricity of the pump impeller and the clutch output member. Moreover, the transmitting system involves large numbers of components and assembling steps, the conventional transmitting system is also disadvantageous in terms of cost reduction.

BRIEF SUMMARY OF THE INVENTION

Accordingly, it is an object of the present invention to provide a transmitting system of the above-described type for a small-sized vehicle, which is capable of providing favorable maintainability and of preventing occurrence of rotation vibrations and unusual noises without requiring machining with high precision, with small numbers of components and assembling steps, and less expensive.

To achieve the above object, according to a first feature of the present invention, there is provided a transmitting system for a small-sized vehicle in which a centrifugal clutch and a torque converter are interposed in series between a crankshaft of an engine and an output gear relatively rotatably carried on the crankshaft, wherein a pump impeller of the aforesaid torque converter and an output drum of the aforesaid centrifugal clutch placed adjacently to the pump impeller are integrally coupled, with an open surface of the output drum facing an opposite side to the pump impeller, to be constructed as a single component.

With the first feature, the pump impeller and the output drum of the centrifugal clutch are integrally coupled to be constructed as a single component, thereby making it possible to integrally couple both of them while securing concentricity of the pump impeller and the output drum without requiring machining with high precision, to prevent occurrence of rotation vibrations and unusual noises, and also reducing cost with reduction of the numbers of components and assembling steps. Moreover, in the output drum of the centrifugal clutch, its open surface faces the opposite side to the pump impeller, and therefore the components inside the output drum can be attached and detached from the side of the open surface though the output drum cannot be separated from the pump impeller, thus providing favorable maintainability.

According to a second feature of the present invention, there is provided a transmitting system for a small-sized vehicle in which a centrifugal clutch and a torque converter are interposed in series between a crankshaft of an engine and an output gear relatively rotatably carried on the crankshaft, and the aforesaid centrifugal clutch is provided with a one way clutch for transmitting only a reverse load from a clutch output member to a clutch input member, wherein a pump impeller of the aforesaid torque converter and the aforesaid clutch output member adjacent to the pump impeller are integrally coupled to a common hub relatively rotatably carried on the crankshaft to be constructed as a single component, and wherein a plurality of clutch elements are interposed between the aforesaid common hub and a clutch inner connected to the aforesaid clutch input member and disposed in the aforesaid common hub to construct the aforesaid one way clutch.

The aforesaid clutch input member and clutch output member respectively correspond to the driving plate 5 and the output drum 9 in an embodiment of the present invention, which will be described later.

With the second feature, the pump impeller and the clutch output member are integrally coupled to be constructed as a single component, thereby making it possible to integrally couple both of them while securing concentricity of the pump impeller and the clutch output member without requiring machining with high precision, to prevent occurrence of rotation vibrations and unusual noises, and reducing cost with reduction of the numbers of components and assembling steps. Moreover, the common hub also serves as the clutch outer of the one way clutch, thus simplifying the structure of the one way clutch, so that the cost can be further reduced.

According to a third feature of the present invention, there is provided a transmitting system for a small-sized vehicle including a torque converter comprising a pump impeller with a pump hub being restrained from moving in an axial direction on an input shaft, a stator impeller with a stator hub being connected to a stator shaft relatively rotatably carried on an outer periphery of the input shaft, and a turbine impeller with a turbine hub carried on an outer periphery of the aforesaid stator shaft via a bearing, in which a one-way clutch for making it possible to transmit only a reverse load from a side of the turbine hub to a side of a hub of a side cover is interposed between the hub of the side cover connectively provided at the aforesaid pump impeller and covering a back surface of the aforesaid turbine impeller, and the aforesaid turbine hub, and an output gear is connected to the aforesaid turbine hub, wherein both ends in the axial direction of a whole of the aforesaid stator hub, bearing, turbine hub and output gear axially adjacent to each other are carried on the aforesaid pump hub and an outer cylinder of a free wheel formed at an end portion of the aforesaid stator shaft and restrained from moving in the axial direction on the input shaft respectively via a first and a second needle bearings.

The aforesaid input shaft and the pump hub respectively correspond to the crankshaft 1 and the common hub 11 in the embodiment of the present invention, which will be described later.

With the feature of the third aspect, even if the thrust load acting on the output gear changes the acting direction from the side of the outer cylinder to the side of the pump hub, or from the side of the pump hub to the side of the outer cylinder at the time of engine brake and acceleration of the engine, because both ends of the whole of the stator hub, bearing, turbine hub and output gear axially adjacent to each other are carried on the pump hub and the outer cylinder via the first and the second thrust needle bearings, the fist and the second thrust needle bearings alternately bear the above-described thrust load without impeding the rotation of the output gear at all. As a result, the thrust load on the first and the second thrust needle bearings is comparatively small, thus making it possible to extend the useful life of them. In addition, it is not necessary to interpose the ball bearing of a large capacity as in the prior art adjacently to the aforesaid one way clutch, between the turbine hub and the hub of the side cover, so that the axial dimension of the hub of the side cover, and further the axial dimension of the torque converter can be reduced.

Furthermore, according to a fourth feature of the present invention, there is provided a torque converter comprising a pump impeller connected to an input shaft, a stator impeller with a stator hub being connected to a stator shaft relatively rotatably carried on an outer periphery of the input shaft, and a turbine impeller with a turbine hub carried on an outer periphery of the aforesaid stator shaft via a ball bearing, in which an output gear meshed with a driven gear is connected to the aforesaid turbine hub, wherein a part of tooth portion of the aforesaid output gear is fitted into an inner tooth formed at one end surface of the aforesaid turbine hub, thereby connecting the turbine hub and the output gear to each other.

The input shaft described above corresponds to a crankshaft 1 in an embodiment of the present invention, which will be describe later.

With the fourth feature, the tooth portion of the output gear can be utilized as a connection to the turbine hub, resulting in a simple connecting structure. In addition, it is possible to make the diameter of the output gear smaller, and thus a large reduction ratio can be given between the output gear and the driven gear. Also, since the shape of the output gear is simple, a large number of output gears can be produced from a long hollow cylindrical material, and they can be provided at a low price.

According to a fifth feature of the present invention, in addition to the fourth feature, a tooth portion of the aforesaid output gear is provided with a transmitting tooth portion meshed with the aforesaid driven gear, and a connecting tooth portion smaller in diameter than the transmitting tooth portion and fitted into the aforesaid inner tooth gear.

With the fifth feature, the connecting tooth portion of the output gear is formed to be smaller in diameter than the transmitting tooth portion, thereby avoiding an increase in the diameter of the inner gear into which the connecting tooth portion is fitted and further an increase in the diameter of the turbine hub, so that it possible to contribute to reduction in size of the torque converter.

The above and other objects, features and advantages of the invention will become apparent from the following description of the preferred embodiment taken in conjunction with the accompanying drawings.

BRIEF DESCRIPTION OF THE DRAWINGS

FIGS. 3A to 3D are views explaining a method for manufacturing an output gear.

DETAILED DESCRIPTION OF THE PREFERRED EMBODIMENT

A preferred embodiment of the present invention will be described below based on the attached drawings.

Figure 1:
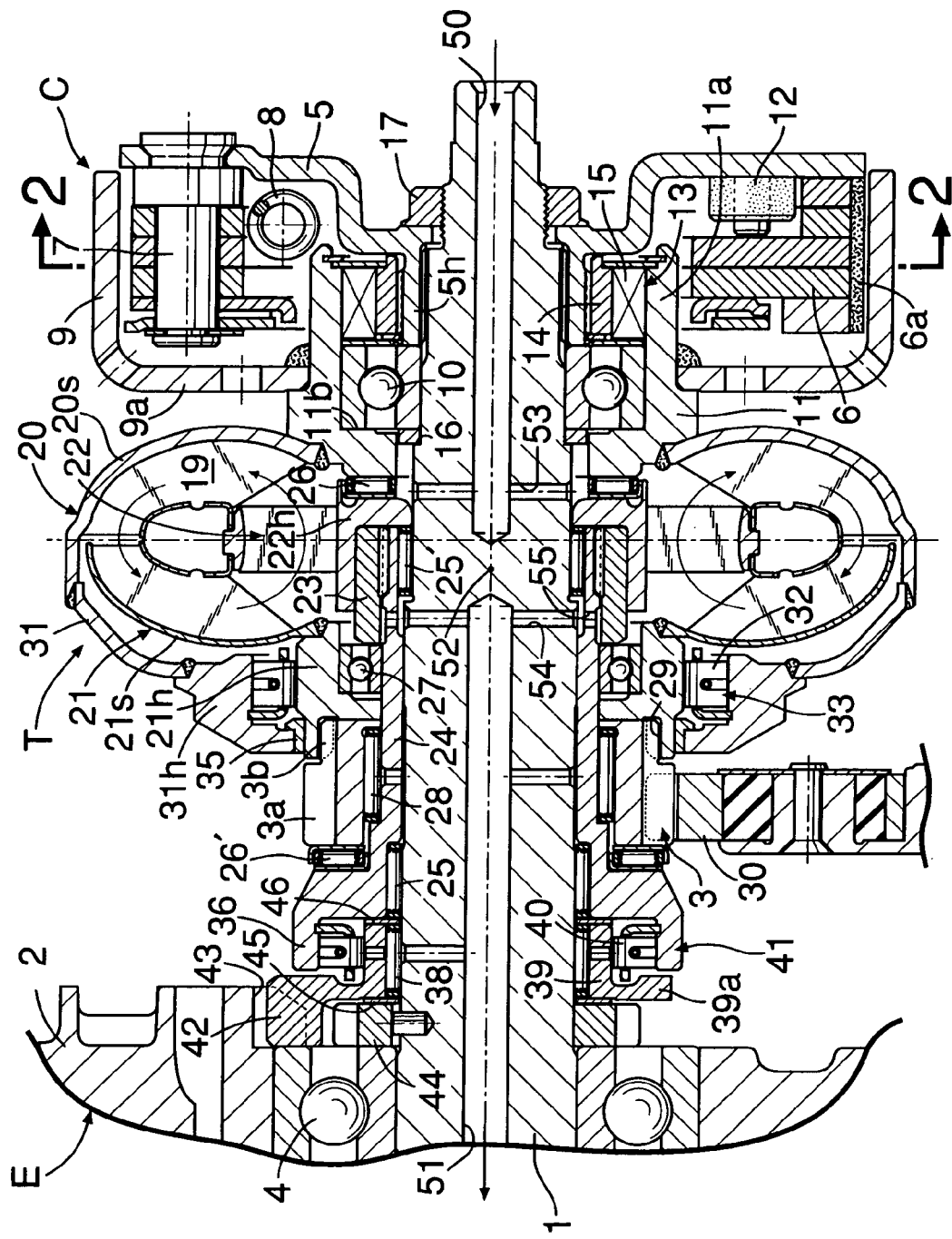
FIG. 1 is a vertical sectional view of a power transmitting system for a small-sized vehicle according to an embodiment of the present invention.

In FIG. 1, on a crankshaft 1 carried on a crankcase 2 of an engine E for a small-sized vehicle via a radial ball bearing 4, a centrifugal clutch C, a torque converter T and an output gear 3 are placed in sequence from a shaft end side, at a location outside from the above-described radial ball bearing 4.

Figure 2:
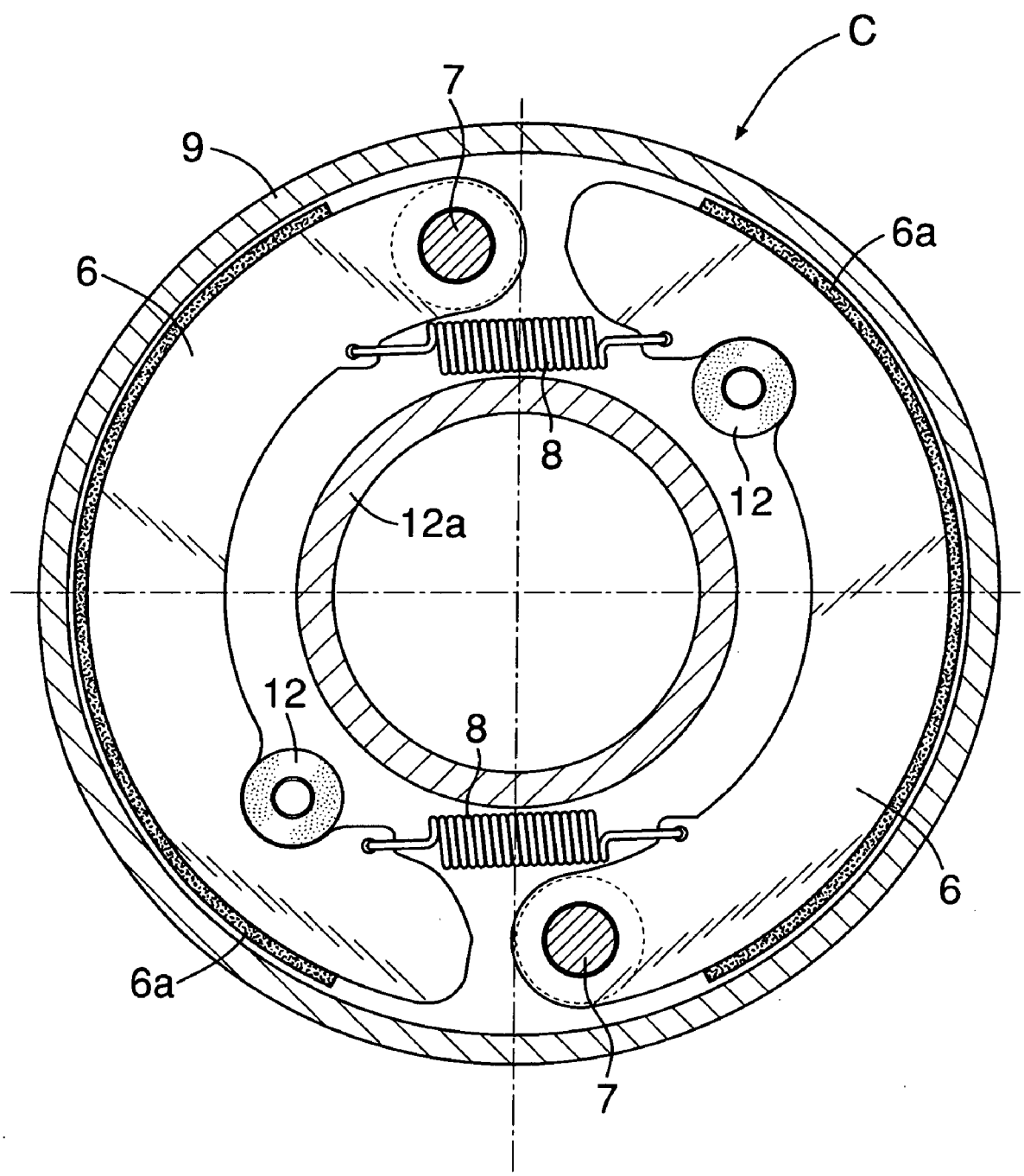
FIG. 2 is a sectional view taken along a line 2—2 in FIG. 1.

First, a construction of the centrifugal clutch C will be explained also referring to FIG. 2.

The centrifugal clutch C is constructed by a driving plate 5 with a hub 5h being spline-coupled to an end portion of the crankshaft 1, a pair of clutch shoes 6 and 6 swingably supported at this driving plate 5 via pivots 7 and 7, a pair of return springs 8 and 8 connected to portions between the clutch shoes 6 and 6 to bias them in a diameter reducing direction, and a bottomed cylindrical output drum 9 disposed to surround the clutch shoes 6 and 6.

The output drum 9 is disposed with its open surface facing to an opposite side to the torque converter T. An end wall portion 9a of the output drum 9 is fitted and welded to an outer periphery of a hub 11 carried on the crankshaft 1 via a radial ball bearing 10. The hub 11 is shared by a pump impeller 20 which will be described later, and therefore, this will be hereinafter called a common hub.

A friction lining 6a in slidable contact with an inner peripheral surface of the output drum 9 is bonded to outer peripheral surfaces of the clutch shoes 6 and 6. The driving plate 5 is provided with stopper 12 and 12 abutting against inner peripheral portions of the clutch shoes 6 and 6 to restrain reduction in diameter of the clutch shoes 6 and 6. The weight of the clutch shoes 6 and 6 and a set load of the return springs 8 and 8 are set so that the clutch shoes 6 and 6 expand in diameter, by action of a centrifugal force, to cause the friction linings 6a to be in pressure contact with the inner peripheral surface of the output drum 9, when the crankshaft 1 rotates at a predetermined or higher rotational speed exceeding an idling rotational speed.

The common hub 11 has a cylindrical protruded portion 11a projecting into the output drum 9 from the radial ball bearing 10 to surround the hub 5h of the driving plate 5. With this protruded portion 11a used as a clutch outer, a one way clutch 13 is constructed between the driving plate 5 and the hub 5h. Namely, the one way clutch 13 is constructed by interposing a large number of annularly arranged clutch elements 15 such as sprags and rollers between the protruded portion 11a and a clutch inner 14 spline-coupled to an outer periphery of the hub 5h of the driving plate 5. The one way clutch 13 makes it possible to transmit power only in one direction from a side of the common hub 11 to a side of the driving plate 5, namely, to a side of the crankshaft 1.

The hub 5h of the driving plate 5 and an inner race of the aforesaid radial ball bearing 10 are fixed onto the crankshaft 1 by an annular shoulder portion 16 of the outer peripheral surface of the crankshaft 1 and a nut 17 which is screwed and fastened to an end portion of the crankshaft 1. The common hub 11 has an annular shoulder portion 11b of its inner periphery abutting against an outer race of the aforesaid radial ball bearing 10, so that its axial movement in a direction of a shaft end of the crankshaft 1 is restricted.

Next, a construction of the torque converter T will be explained.

Referring again to FIG. 1, the torque converter T is comprised of the pump impeller 20, a turbine impeller 21 of which outer peripheral portion is placed to oppose to an outer peripheral portion of the pump impeller 20, and a stator impeller 22 diposed between their inner peripheral portions. A circulating circuit 19 for power transmission by operating oil is defined through these three impellers 20, 21 and 22.

A shell 20s of the pump impeller 20 is fitted on and welded to an outer periphery of the common hub 11. Thus, the pump impeller 20 and the output drum 9 of the centrifugal clutch C are concentrically and integrally coupled to each other via the common hub 11, to construct a single component.

A steel sleeve 23 is press-fitted into a hub of the stator impeller 22, that is, a stator hub 22h from a side of its one end surface. This sleeve 23 is spline-coupled to one end of a hollow cylindrical stator shaft 24 (made of steel) which is relatively rotatably fitted on the outer periphery of the crankshaft 1.

The stator shaft 24 is thus spline-coupled to the press-fitted sleeve 23 made of steel, whereby durability of the coupling portions of the stator impeller 22 and the stator shaft 24 can be enhanced.

A pair of left and right radial needle bearings 25 and 25' are interposed between the stator shaft 24 and the crankshaft. A first thrust needle bearing 26 is interposed between the stator hub 22h and the common hub 11.

A turbine hub 21h welded to a shell 21s of the turbine impeller 21 is carried on an outer periphery of the stator shaft 24 via a radial ball bearing 27.

The output gear 3 is connected to the turbine hub 21h, and carried on the outer periphery of the stator shaft 24 via a radial needle bearing 28. In this output gear 3, a transmitting tooth portion 3a and a connecting tooth portion 3b which is smaller in width and diameter than the transmitting tooth portion 3a, are formed side by side in the axial direction. The connecting tooth portion 3b is fitted into an inner tooth gear 29 formed at an outer end portion of the above-described turbine hub 21h, whereby the output gear 3 and the turbine hub 21h are connected. A driven gear 30 connected to an input shaft (not shown) of a transmission is meshed with the transmitting tooth portion 3a. The above-described inner tooth 29 is formed by cutting, forging or the like.

A side cover 31 for covering a back surface of the turbine impeller 21 is connectively provided by welding at an outer peripheral end of the shell 20s of the pump impeller 20. A hub 31 of this side cover 31 is placed to surround the turbine hub 21h. A large number of annularly arranged clutch elements 32 such as sprags and rollers are interposed between the hubs 31h and 21h to construct a one way clutch 33. This one way clutch 33 makes it possible to transmit power only in one direction from a side of the turbine impeller 21 to a side of the side cover 31, namely, to a side of the pump impeller 20.

A seal/cum-bearing sleeve 35 adjacent to an outer side of the one way clutch 33 is interposed between the hubs 31h and 21h.

An outer cylinder 36 adjacent to an outer surface of the output gear 3 is integrally formed at the stator shaft 24. A second thrust needle bearing 26' is interposed between the output gear 3 and outer cylinder 36. An inner cylinder 39 relatively rotatably carried on the crankshaft 1 via a needle bearing 38 is placed inside this outer cylinder 36. A large number of annularly arranged clutch elements 40 such as sprags and rollers are interposed between the inner and outer cylinders 39 and 36 to construct a free wheel 41. The inner cylinder 39 has a flange 39a at one end thereof. A protrusion 42 protruded sideways from this flange 39a is locked at a stopper groove 43 provided at the crankcase 2, and is carried on an end surface of an inner race of the radial ball bearing 4 via an auxiliary driving gear 44 also serving as a spacer, and a washer 45. The stator shaft 24 is carried on an end surface of the above-described inner cylinder 39 via a thrust washer 46. Thus, the stator shaft 24 and the outer cylinder 36 integrated therewith are restrained from moving axially to a side of the crankcase 2.

On the other hand, since the common hub 11 is restrained from moving axially in a direction of the shaft end of the crankshaft 1 by the outer race of the radial ball bearing 10 as mentioned above, both ends in the axial direction of a whole of the stator hub 22h, thrust ball bearing 27, turbine hub 21h and the output gear 3 which are adjacent to each other in the axial direction, are carried by the common hub 11 and the outer cylinder 36 respectively via the first and the second thrust needle bearings 26 and 26', so that axial movement in both directions to the side of the crankcase 2 and the side of a shaft end of the crankshaft 1 is restrained.

The thrust washer 46 between the stator shaft 24 and the inner cylinder 39 is interposed between the needle bearings 25 and 38 adjacent to each other in the axial direction, to prevent mutual interference between them.

An upstream oil passage 50 leading to a discharge port of an unillustrated oil pump and a downstream oil passage 51 connecting to a lubricating section of the engine E, are formed in a central part of the crankshaft 1 to sandwich a partition wall 52 therebetween. An inlet bore 53 and an outlet bore 54 radially extending from these upstream oil passage 50 and downstream oil passage 51, are provided in the crankshaft 1. The inlet bore 53 communicates with the circulating circuit 19 via the thrust needle bearing 26. The outlet bore 54 communicates with the downstream oil passage 51, via a through-bore 55 of the stator shaft 24, a space between the sleeve 23 and the radial ball bearing 27. Accordingly, during the operation of the engine E, the circulating circuit 19 is filled with oil supplied from the upstream oil passage 50 through the inlet bore 53. Therefore, each part of the engine E is lubricated by the oil discharged into the downstream oil passage 51 from the circulating circuit 19 through the outlet bore 54.

Next, an operation of this embodiment will be explained.

During idling rotation of the crankshaft 1, the clutch shoes 6 and 6 are held in a reduced diameter position in which they abut against the stoppers 12 and 12 by set load of the return springs 8 and 8, with their friction linings 6a being spaced from the inner peripheral surface of the output drum 9, and therefore the centrifugal clutch C keeps in a turned-off state.

When the crankshaft 1 is rotated at a rotational speed of a predetermined value or more exceeding the idling rotational speed, the clutch shoes 6 and 6 swing by the centrifugal force in a diameter increasing direction against the set load of the return springs 8 and 8, and when the friction linings 6a are pressed in contact with the inner peripheral surface of the output drum 9, the centrifugal clutch C is brought into a clutch turned on state. Accordingly, the rotation of the crankshaft 1 is outputted from the output drum 9, and transmitted to the pump impeller 20 of the torque converter, to thereby start the vehicle.

When the pump impeller 20 is rotated by the output drum 9, the operating oil filling the circulating circuit 19 transmits the rotation torque of the pump impeller 20 to the turbine impeller 21 while circulating through the pump impeller 20, the turbine impeller 21, the stator impeller 22 and the pump impeller 20, and further transmits the rotation torque from the turbine hub 21h to the output gear 3, and through the unillustrated transmission to driving wheels of the vehicle to drive them. In this process, if a torque amplifying action occurs between the pump impeller 20 and the turbine impeller 21, a reaction force accompanying it acts on the stator impeller 22, but the stator impeller 22 is prevented from rotating by the crankcase 2 via the protrusion 42 of the inner cylinder 39 by the locking action of the free wheel 41.

After finishing the torque amplifying action, the stator impeller 22 is rotated in the same direction as the pump impeller 20 and the turbine impeller 21 with them while idle-running the free wheel 41, by the reverse rotation in the torque direction which the stator impeller 22 receives.

At the time of deceleration of the vehicle, when the reverse load is transmitted from the output gear 3 to the turbine hub 21h, the one way clutch 33 is brought into a connected state to directly coupling the turbine hub 21h and the side cover 31, so that the reverse load is directly transmitted from the turbine hub 21h to the side cover 31. When the reverse load is further transmitted from the pump impeller 20 to the common hub 11, the one way clutch 13 is brought into a connected state to directly couple the common hub 11 with the driving plate 5, so that, even when the centrifugal clutch C is in the turned-off state, the reverse load is directly transmitted to the crankshaft 1. Accordingly, a favorable engine brake effect can be obtained without causing a slip between the turbine impeller 21 and the pump impeller 20, thereby providing an excellent engine brake effect.

At the time of deceleration and at the time of acceleration of the engine E as described above, the thrust load acting on the output gear 3 changes the acting direction from the side of the outer cylinder 36 to the side of the common hub 11, or from the side of the common hub 11 to the side of the outer cylinder 36. However, since the whole of the stator hub 22h, the radial ball bearing 27, the turbine hub 21h and the output gear 3 adjacent to each other in the axial direction is axially carried by the common hub 11 and the outer cylinder 36 via the first and the second thrust needle bearings 26 and 26' as mentioned above, both the thrust needle bearings 26 and 26' alternately bear the above-described thrust load without impeding rotation of the output gear 3 at all. Consequently, the thrust load bearing of each of the thrust needle bearings 26 and 26' is comparatively small, thus making it possible to extend the useful life of them.

In addition, besides the one way clutch 33, only the seal/cum-bearing sleeve 35 being a small component is interposed between the hub 31h of the side cover 31 and the turbine hub 21h, and therefore it is possible to reduce an axial dimension of the hub 31h of the side cover 31 and further the axial dimension of the torque converter T, thereby making the torque converter T compact.

Since the pump impeller 20 and the output drum 9 of the centrifugal clutch C are integrally coupled to each other via the common hub 11 to construct the single component, both the pump impeller 20 and the output drum 9 can be integrally coupled while securing concentricity of the pump impeller 20 and the output drum 9 without requiring machining with high precision, and occurrence of rotation vibrations and unusual noises of the pump impeller 20 and the output drum 9 can be prevented, thus making it possible to reduce cost with reduction of the numbers of components and assembling steps.

Since the common hub 11 also serves as the clutch outer of the one way clutch 13 for making it possible to transmit the reverse load from the pump impeller 20 to the crankshaft 1, the structure of the one way clutch 13 is simplified, and the cost can be further reduced.

In addition, in the bottomed cylindrical output drum 9, its open surface faces to the opposite side to the pump impeller 20, and therefore the components inside the output drum 9 can be attached and detached to and from the side of the open surface, though the output drum cannot be separated from the pump impeller 20, thus providing favorable maintainability.

Since the output gear 3 is connected to the turbine hub 21h by fitting its connecting teeth portion 3b into the inner teeth gear 29 formed at the turbine hub 21h, the connection structure is simple, and reduction in diameter of the output gear 3 becomes possible, so that it is possible to set a large reduction ratio between the output gear 3 and the driven gear 30.

Further, the connecting tooth portion 3b of the output gear 3 is formed to be smaller in diameter than the transmitting tooth portion 3a, and therefore an increase in the diameter of the inner tooth gear 29 into which the connecting tooth portion is fitted, and further an increase in the diameter of the turbine hub 21h are avoided, to thereby contribute to reduction in size of the torque converter T.

Next, an efficient method for manufacturing the gear 3 will be explained based on FIGS. 3A to 3D.

First, as shown in FIG. 3A, a long hollow cylindrical material M corresponding to the length of a large number of output gears 3, 3 . . . aligned in an axial direction is prepared. The annular grooves 56 are formed on its outer peripheral surface corresponding to the connecting tooth portions 3b of the respective output gears 3, 3 . . . by cutting, forging or the like. Next, as shown in FIG. 3B, the transmitting tooth portions 3a and the connecting tooth portions 3b of a large number of output gears 3, 3 . . . are formed at a time by continuously performing gear cutting or tooth forming on the outer peripheral surface of the material M. Thereafter, as shown in FIG. 3C, the material M is cut in a slice for each of the output gears 3, and finally, as shown in FIG. 3D, finishing work is performed for each of the output gears 3.

According to such a method for manufacturing the output gear 3, the transmitting and connecting tooth portions 3a and 3b of a large number of output gears 3, 3 . . . are formed by one step of tooth cutting or tooth forming, and therefore a large number of output gears 3, 3 . . . can be manufactured efficiently, and provided at a low price.

The present invention is not limited to the above-described embodiment, and various modifications in design may be made without departing from the subject matter of the invention defined in the claims. For example, in integral coupling of the output drum 9 and the pump impeller 20, the end wall 9a or the peripheral wall of the output drum 9 and the shell 20s of the pump impeller 20 may be coupled by welding or the like.

What is claimed is:

1. A transmitting system for a small-sized vehicle in which a centrifugal clutch and a torque converter are interposed in series between a crankshaft of an engine and an output gear relatively rotatably carried on the crankshaft,
  wherein a pump impeller of said torque converter and an output drum of said centrifugal clutch placed adjacently to the pump impeller are integrally coupled to an outer periphery of a common hub by welding, with an open surface of the output drum facing an opposite side to the pump impeller, to be constructed as a single component.

2. The transmitting system according to claim 1, wherein the common hub is carried on the crankshaft via a radial ball bearing.

3. A transmitting system for a small-sized vehicle in which a centrifugal clutch and a torque converter are interposed in series between a crankshaft of an engine and an output gear relatively rotatably carried on the crankshaft, and said centrifugal clutch is provided with a one way clutch for transmitting only a reverse load from a clutch output member to a clutch input member,
  wherein a pump impeller of said torque converter and said clutch output member adjacent to the pump impeller are integrally coupled to a common hub relatively rotatably carried on the crankshaft to be constructed as a single component, and
  wherein a plurality of clutch elements are interposed between said common hub and a clutch inner spline connected to said clutch input member and disposed in said common hub to construct said one way clutch.

4. A torque converter comprising a pump impeller with a pump hub being restrained from moving axially on an input shaft, a stator impeller with a stator hub being connected to a stator shaft relatively rotatably carried on an outer periphery of the input shaft, and a turbine impeller with a turbine hub carried on an outer periphery of said stator shaft via a bearing, in which a one-way clutch for making it possible to transmit only a reverse load from a side of the turbine hub to a side of a hub of a side cover is interposed between the hub of the side cover connectively provided at said pump impeller and covering a back surface of said turbine impeller, and said turbine hub, and an output gear is connected to said turbine hub,
  wherein both ends in an axial direction of a whole of said stator hub, bearing, turbine hub and output gear axially adjacent to each other are carried on said pump hub and an outer cylinder of a free wheel formed at an end portion of said stator shaft and restrained from moving axially on the input shaft respectively via a first and a second needle bearings.

5. A torque converter comprising a pump impeller connected to an input shaft, a stator impeller with a stator hub being connected to a stator shaft relatively rotatably carried on an outer periphery of the input shaft, and a turbine impeller with a turbine hub carried on an outer periphery of said stator shaft via a ball bearing, in which an output gear meshed with a driven gear is connected to said turbine hub,
  wherein a part of tooth portion of said output gear is fitted into an inner tooth formed at one end surface of said turbine hub, thereby connecting the turbine hub and the output gear to each other.

6. The torque converter according to claim 5, wherein the tooth portion of said output gear is provided with a transmitting tooth portion meshed with said driven gear and a connecting tooth portion smaller in diameter than the transmitting tooth portion and fitted into said inner tooth gear.

\* \* \* \* \*